United States Patent [19]

Forsberg

[11] 3,820,840
[45] June 28, 1974

[54] TRUCK BODY COVER
[76] Inventor: Jason A. Forsberg, 7103 Rose Ave., Orlando, Fla. 32810
[22] Filed: Aug. 1, 1973
[21] Appl. No.: 384,625

[52] U.S. Cl. ............296/100, 296/137 B, 105/377
[51] Int. Cl. ............................................ B60p 7/04
[58] Field of Search ............ 296/100 R, 105, 137 B; 137/525.3; 160/84; 61/1 R, .5; 105/377

[56] References Cited
UNITED STATES PATENTS
3,074,079  1/1963  Isaacson ...................... 160/84 R X
3,138,399  6/1964  Hughes .............................. 296/100
3,416,835  12/1968  Ohle .................................. 296/100

Primary Examiner—Drayton E. Hoffman
Assistant Examiner—Larry H. Martin
Attorney, Agent, or Firm—Duckworth, Hobby & Allen

[57] ABSTRACT

A truck body cover includes a flexible cover and two rails each mounted along the peripheral side of the truck body, with sliding members mounted on the rails. V-shaped spring members having arms attached to the cover are pivoted on the sliding members so as to accordion the cover when the members are drawn together and tension the cover along the peripheral side when the members are drawn apart.

9 Claims, 5 Drawing Figures

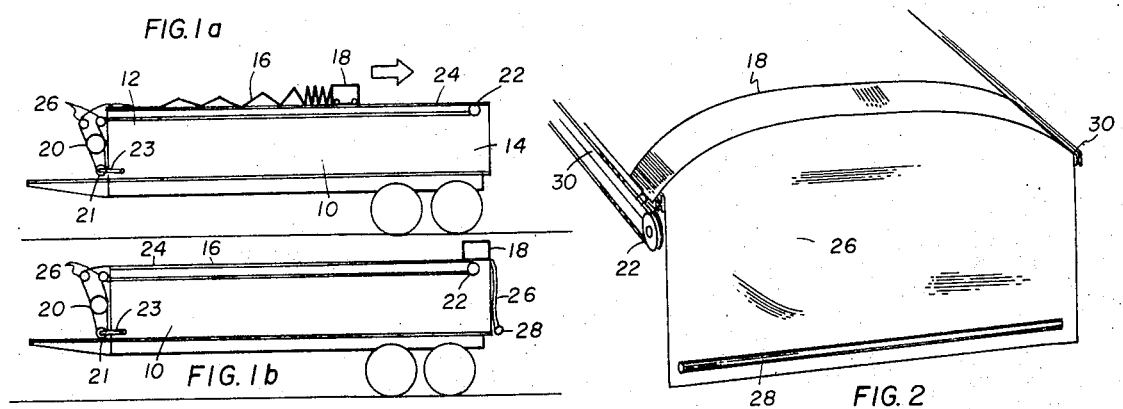
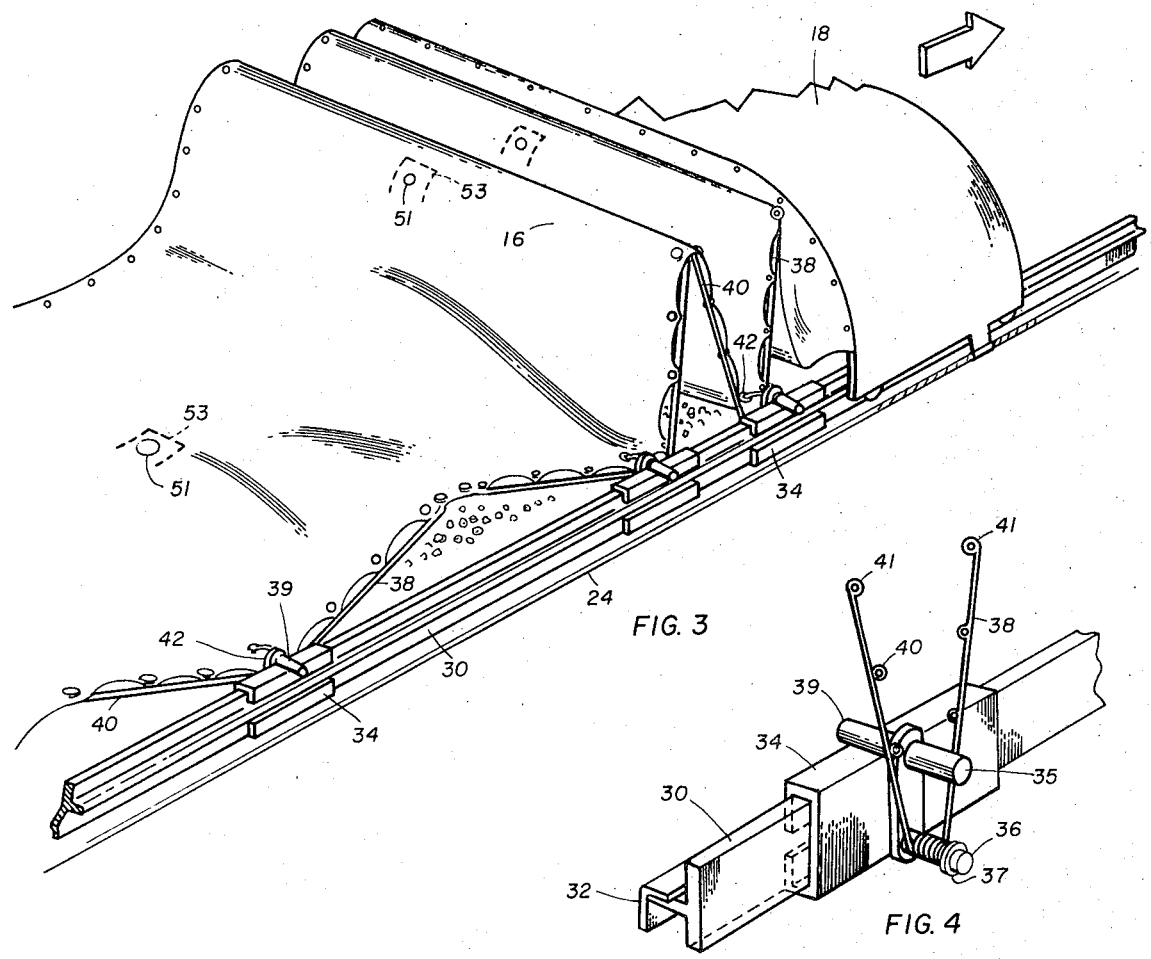

TRUCK BODY COVER

BACKGROUND OF THE INVENTION

1. Field of the Invention

The present invention relates to truck body covers, and in particular to such covers which may be easily emplaced by the truck operator in a short period of time from a single position near one end of the truck.

2. Description of the Prior Art

Sand, gravel and similar material present a serious road hazard if hauled about in open truck beds. Legislation in many states now requires truck owners and operators to cover such loads so as to prevent spillage. In many cases, these covers are simple tarpaulins which are manually tied down over the open bed. But the emplacement of these manual devices is time consuming and hazardous and is therefore not feasible for commercial trucking operations.

It is therefore desirable to employ means for emplacing an appropriate cover which the truck operator may quickly and easily employ. It is also necessary that such arrangements be relatively inexpensive and be easily put on and taken off the vehicle as the uses of the vehicle dictate.

There have been several arrangements suggested in the prior art. Of particular interest, Richard, in U.S. Pat. No. 3,041,104, Greenberg, in U.S. Pat. No. 3,310,338, and Reese in U.S. Pat. No. 3,012,813, all teach arrangements in which a flexible cover is folded in an accordion-like manner and thereafter drawn across the truck body. Other arrangements are taught in the following U.S. Pat. Nos.: 3,416,834 to Morse; 3,488,087 to Cox; 3,511,408 to Hughes; 3,498,666 to Harrawood; 3,349,198 to Cappello; 3,138,399 to Hughes; and 3,416,835 to Ohle Further references are found in Patent Office Class 296, subclass 100, among others.

SUMMARY OF THE INVENTION

The present invention contemplates a truck body cover arrangement comprising a flexible cover and two rails, each rail adapted for mounting along the periphery of a side of a truck body. The arrangement further includes sliding members on each rail, with spring tensioning means fixed to each sliding member and the flexible cover so as to accordion the cover when the members are drawn together and tension the cover along the peripheral side when the members are drawn apart.

THE DRAWING

FIGS. 1(a) and 1(b) illustrate a wide view of a truck body employing the cover of the present invention.

FIG. 2 is a perspective end view of a portion of the cover of the present invention.

FIG. 3 is a perspective side view of the cover of the present invention.

FIG. 4 is a perspective view of a portion of the apparatus shown in FIG. 3.

DETAILED DESCRIPTION

A truck body cover arrangement in accordance with the present invention will be described with reference to the drawing.

Noting FIG. 1(a), there is shown a truck body 10 having a forward end 12 and a rearward end 14. A flexible cover 16 and a frame member 18 are joined together and are slidably fitted over the truck body 10 in a manner described below with reference to FIGS. 3 and 4. A drum 20 is fitted at the forward end 12 and a pulley 22 is fitted at the rearward end 14. An endless cable 24 is fitted about the drum 20 and the pully 22, the cable being positioned by guide pulleys 26 as required. A reduction gear 21 having a crank 23 is coupled to the drum 20. The crank 23 may be driven manually or by an electric motor. The cable 24 is fastened to the frame member 18.

Noting FIG. 1(a) and 2, a flexible end curtain 26 is attached to the frame member 18, the curtain 26 including a weight 28 therewith to facilitate draping of the curtain adjacent the rearward end 14 of the truck 10 when the cover is in place.

Reference is now made to FIGS. 3 and 4, which illustrate the manner in which a cover 16 may be emplaced easily and in a facile manner by a single operator in a short period of time.

The arrangement of FIGS. 3 and 4 includes a T-shaped rail 30, or similar means, which are fixed along each peripheral top side of the truck body 10 by brackets 32. A plurality of sliding members 34 are mounted on the rails 30. Each sliding member 34, in this example, comprises sections of a metal bracket or similar article adapted to slidably fit about the T-shaped rails 30 and having two inwardly extending pins 35, 37 and an outwardly extending pin 39, one of the inwardly extending pins 37 being positioned below the other. As shown in FIG. 2, the frame member 18 bridges and is slidably mounted on the two rails 30.

The cover arrangement of the present invention further comprises spring tensioning means fixed to each sliding member 34 and the flexible cover 16 so as to accordion the cover 16 when the sliding members are drawn together and tension the cover 16 along the periphery of the truck sides when the sliding members are drawn apart. In this embodiment, the spring tensioning means comprises a plurality of springs, each spring having two arms 38, 40 and a tensioned pivot 36 mounted on each of the lower pins 37 of the sliding members 34, with the two arms 38, 40 thereof positioned on opposite sides of the upper pin 35. Each spring arm 38, 40 includes loops 41 therealong. The cover 16 has equidistantly spaced eyelets 42 fitted about either the inward pin 35 or the outward pin 39. The cover 16 is fastened to the loops 41 of the spring arms 38, 40 by rivets (not numbered) or similar fastening means. The cover 16 further includes grommets 51 therein, and a flap 53 sewn on three sides of the grommet on the inside of the cover. The fourth side, toward the front end 12, is left unsewn.

The cover arrangement described above and illustrated in the drawings, operates in the following manner. Initially, the frame member 18 and the cover 16 are retracted to the forward end 12 of the truck body 10, to allow the truck body to be loaded. Thereafter, the truck operator rotates the crank 23, causing the gear 21 to rotate the drum 20 causing the cable 24 to move the frame member 18 along the rails 30. As the frame member 18 slides along the rails 30, the cover 16 is pulled out of the retracted, accordion position, causing the sliding members 34 to be drawn apart. As the cover 16 is pulled taut across the truck body 10, the spring arms 38, 40 expand under the tension to hold the cover close to the top periphery of the sides of the truck body 10. When the frame member 18 reaches the rearward end 14 of the truck body 10, the flexible end curtains 26 drape downward.

When the operator reaches his destination, the cranking operation is reversed, causing the frame member 18 to slide to the forward end 12 of the truck body 10. As the tension on each spring arm 38, 40 is released, each arm folds the cover 18 in an accordion-like manner, while the eyelets 42 remain fixed about the pin 35, until the entire cover is folded at the forward end 12 of the truck body. The grommets 51 prevent water from standing on the cover 16, while the flap 58 prevents sand from blowing back out of the grommets.

The above description is by way of example only, and it will be understood by those skilled in the art that a variety of modifications may be made to the above-identified structural arrangement without departing from the spirit and scope of the present invention, which is defined in the following claims.

I claim:

1. A truck body cover arrangement comprising:
   a flexible cover;
   two rails, each adapted for mounting along the peripheral top side of a truck body;
   sliding members on said rails;
   spring tensioning means fixed to each of said sliding members and directly to the periphery of said flexible cover so as to accordion said cover when said members are drawn together and tension said cover along said peripheral side when said members are drawn apart; and
   means for alternatively drawing said members together and apart.

2. Apparatus as recited in claim 1 wherein said drawing means comprises:
   a frame member joined with the cover and bridging and slidably mounted on said two rails;
   endless pulley means for alternatively drawing said frame member back and forth over said truck body.

3. Apparatus as recited in claim 2 wherein said truck body includes a forward end and a rearward end, and wherein said endless pulley means comprises:
   a drum adapted for mounting at said forward end;
   a pulley mounted on said rearward end; and
   an endless cable extending about said drum and said pulley and joined to said frame member.

4. Apparatus as recited in claim 3 further comprising gear reduction means for rotating said drum.

5. Apparatus as recited in claim 4 wherein said frame member includes a flexible end curtain having a weight attached to the extremity thereof, said end curtain adapted to drape adjacent said rearward end when said cover is drawn over said truck body.

6. Apparatus as recited in claim 1 wherein said spring tensioning means comprises:
   a plurality of springs, each spring having two arms and a pivot between said two arms, said pivot mounted on one of said sliding members;
   each said arm being fixed along said periphery of said cover; and wherein
   said arms expand laterally under tension when said sliding members are drawn apart and thereafter accordion together when said sliding members are drawn together.

7. Apparatus as recited in claim 5 wherein each said sliding member-spring combination further comprises:

two inwardly extending pins on said sliding member, one of said pins being positioned below the other; and
   said spring pivot being rotatably mounted on said lower pin with said arms on opposing sides of the other pin.

8. Apparatus as recited in claim 7 wherein each said rail comprises a T-shaped bracket.

9. Apparatus as recited in claim 1 further comprising:

a grommet positioned in said cover; and
   an open-sided flap sewn to said cover and under said grommet.

* * * * *